United States Patent [19]
Wipff et al.

[11] 3,755,817
[45] Aug. 28, 1973

[54] RADIO NAVIGATION SYSTEM
[75] Inventors: Frank P. Wipff; James A. Wilson, both of Prescott, Ariz.
[73] Assignee: Airborne Navigation Corporation, Prescott, Ariz.
[22] Filed: May 21, 1971
[21] Appl. No.: 145,796

[52] U.S. Cl.......... 343/112 R, 343/103, 343/112 D, 235/150.2, 235/150.27
[51] Int. Cl............................................. G01s 5/02
[58] Field of Search................ 235/150.27, 150.272; 343/103, 105 R, 112 C, 112 D, 112 R

[56] References Cited
UNITED STATES PATENTS

| | | | |
|---|---|---|---|
| 2,472,129 | 6/1949 | Streeter........................... | 343/112 C |
| 2,844,816 | 7/1958 | O'Brien et al.................... | 343/105 R |
| 2,582,588 | 1/1952 | Fennessy et al................. | 343/112 C |
| 3,095,567 | 6/1963 | Britnell........................... | 343/112 C |
| 3,270,343 | 8/1966 | Bridges........................... | 343/105 R |

*Primary Examiner*—Benjamin A. Borchelt
*Assistant Examiner*—Denis H. McCabe
*Attorney*—Sokolski & Wohlgemuth

[57] ABSTRACT

Guidance signals are provided for trips between two points by two pairs of radio signals transmitted from fixed locations. The first of these two pairs of signals which are used for making distance measurements are transmitted from locations essentially ahead of and behind the track between the starting and finishing points of the trip to be made. A controller on the vehicle is calibrated so that a reading is provided at the start of the journey in accordance with the change in relative travel times the two signals will experience from the start to the finish of the journey, this reading being indicated as the distance to be traversed during the trip. As the distance to the destination is reduced, the distance readout is reduced accordingly. The second pair of stations, which are preferably located along a line substantially normal to and on either side of the vehicle track, provide signals which are utilized in conjunction with the distance signals to provide a left ro right steering signal whenever the vehicle departs from the desired track, a calibration reading being set into the controller in accordance with the change in relative travel times the second pair of signals will experience from the start to the finish of the trip.

16 Claims, 15 Drawing Figures

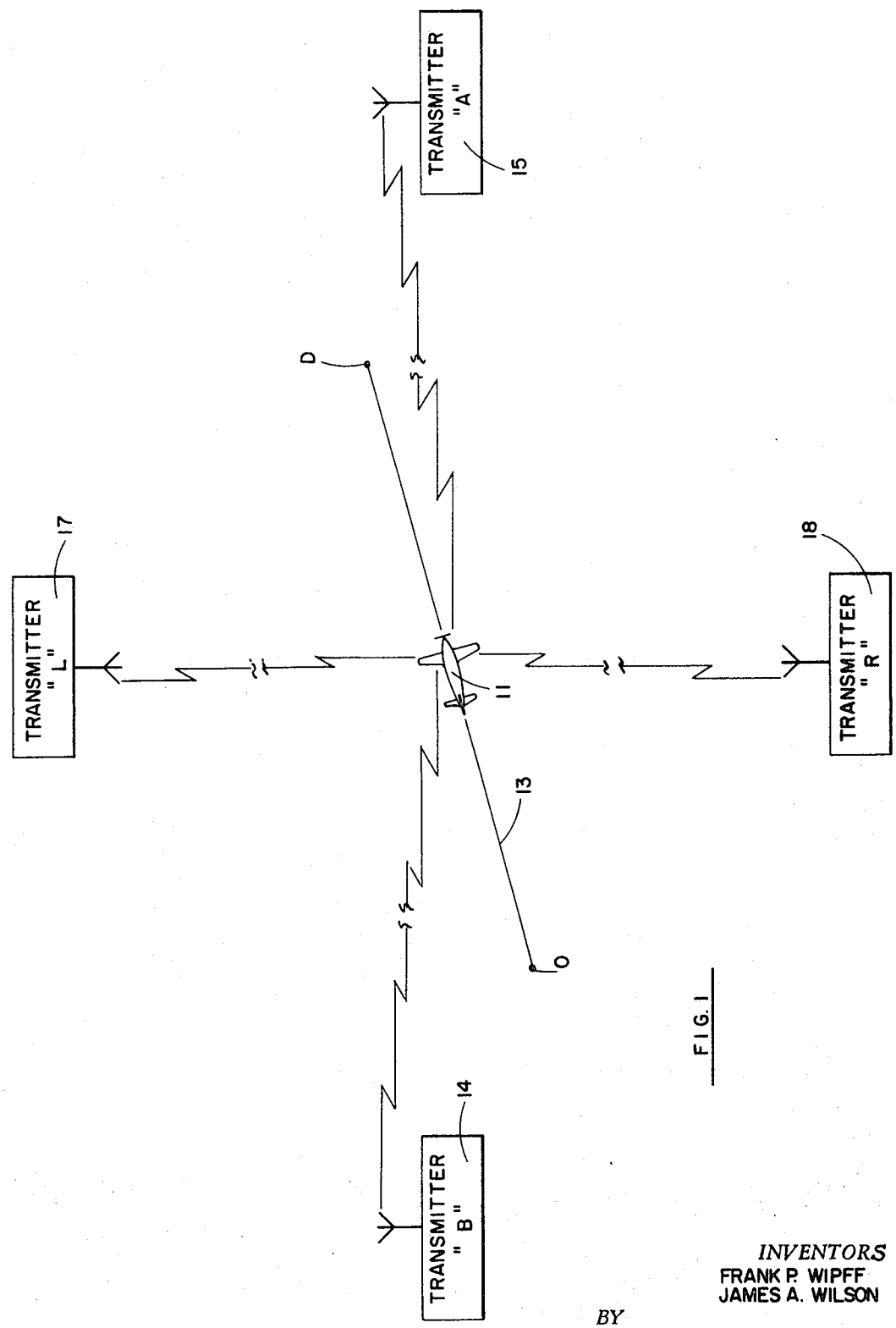

INVENTORS
FRANK P. WIPFF
JAMES A. WILSON

BY

SOKOLSKI & WOHLGEMUTH

ATTORNEYS

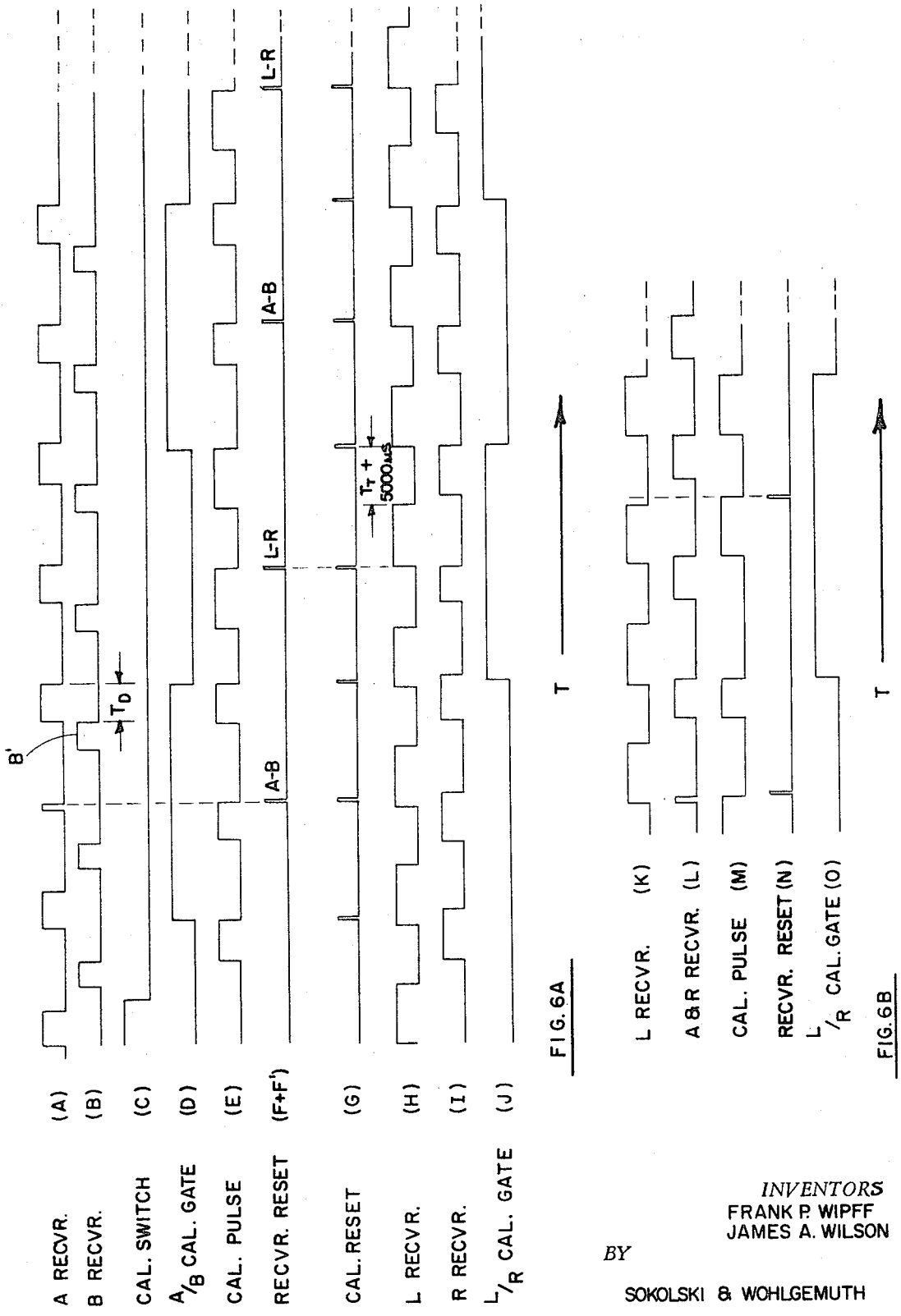

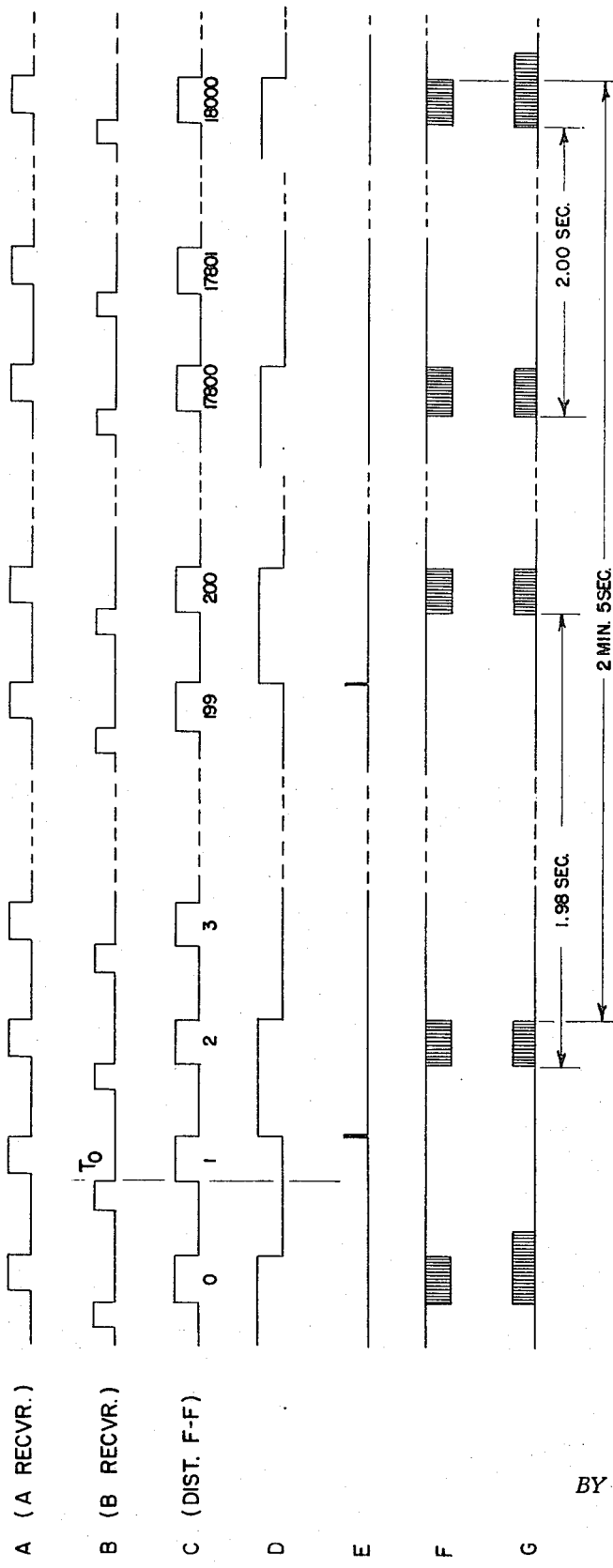

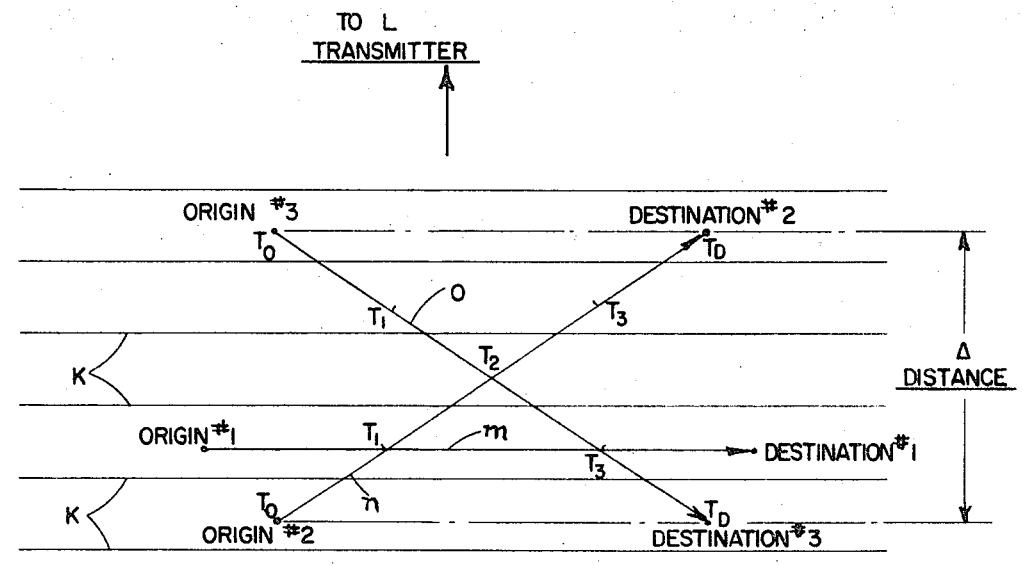
FIG. 11
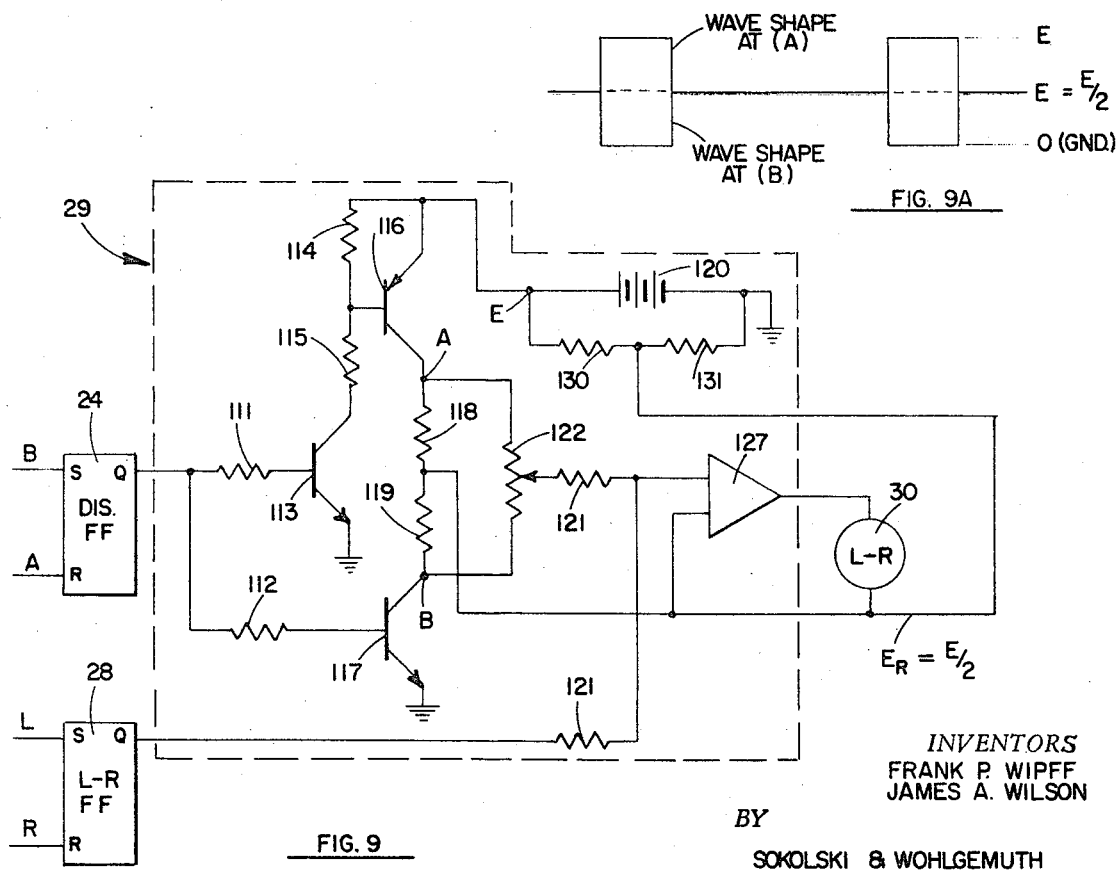
FIG. 9A
FIG. 9
INVENTORS
FRANK P. WIPFF
JAMES A. WILSON
BY
SOKOLSKI & WOHLGEMUTH
ATTORNEYS

INVENTORS
FRANK P. WIPFF
JAMES A. WILSON

BY

SOKOLSKI & WOHLGEMUTH

ATTORNEYS

RADIO NAVIGATION SYSTEM

This invention relates to radio navigation systems and more particularly to such a system utilizing timing measurements between pairs of radio signals to determine the position of a vehicle relative to points of origin and destination.

Radio navigation systems for guiding aircraft take several forms. For relatively short trips (under 1,000 miles) systems providing heading guidance signals, for example of the VOR type, are almost exclusively used. These types of systems, while accurate, are only available when flying over well developed areas such as the continental United States where range stations are set up in elaborate networks between cities of any significant size. However, when flying over less developed areas, radio guidance signals often are not available, leaving the pilot without this form of navigation.

To afford worldwide navigation capabilities, the OMEGA navigation system utilizing very low frequencies, which with a small number of radio transmitters is capable of covering the entire world, has been developed. This type of navigation system, however, requires special equipment adapted for use with the particular system in question. Such equipment is generally of a very expensive and elaborate nature which must be carred on the vehicle. In view of the complexity of this equipment, its maintenance and calibration for reliable operation presents some problem. Each such system is separate in its operation and one must have specially designed equipment for use with each.

The system of this invention is an improved radio navigation system which makes use of very low frequency signals such as provided by OMEGA transmitting stations which have worldwide range, but does not use the OMEGA system or any other special system for its implementation but rather can use any radio signals of suitable related frequencies which have stable, reliable frequency characteristics and fixed and accurately determined positions. Thus, the system of this invention can utilize signals from communications transmitters at commercial and military transmitting sites, such as for example those used at worldwide Naval communication stations, as well as navigational transmitters.

The system of this invetnion operates to provide navigational information for a trip between two predetermined points, this information being in the form of a continuous indication of the distance to the destination as well as steering information indicating deviation from a track line between the origin and the destination. While certain systems of the prior art have been devised for providing this general type of information for a trip between an origin and a destination, utilizing phase measurements between radio signals in their implementations, these systems generally require directional antennas on the vehicle in fixing the vehicle's position and thus are somewhat more complicated and costly and less accurate than would be desired.

The system of this invention provides a relatively simple and economical equipment which utilizes existing radio transmissions for making a voyage between a point of origin and a point of destination, this system being capable of utilizing signals from stations at considerable distances from the vehicle, such that navigation over remote areas is possible.

It is therefore an object of this invention to provide an improved radio navigation system.

It is another object of this invention to provide a radio navigation system capable of operation in remote areas.

It is still another object of this invention to provide an improved radio navigation system capable of utilizing certain existing communications transmitters and other existing transmitters for its implementation.

It is still a further object of this invention to provide an improved radio navigation system which can make use of transmitters located at a great distance from the vehicle being controlled.

It is still a further object of this invention to provide a radio navigation system of great reliability and accuracy which is relatively economical and simple in its construction.

Other objects of this invention will become apparent as the description proceeds in connection with the accompanying drawings, of which:

FIG. 1 is a diagram illustrating the basic operation of the system of the invention;

FIGS. 6A and 6B are a series of waveforms generated in the calibration function of FIG. 5;

FIG. 8 is an illustration of waveforms developed in conjunction with the distance measurement circuitry of FIG. 7;

FIG. 9 is a functional block diagram illustrating steering circuitry that may be utilized in the system of the invention;

FIG. 9A illustrates waveforms generated in the circuit of FIG. 9;

FIG. 11 is a schematic drawing illustrating the traversal of various track lines with the system of the invention.

Briefly described, the system of the invention includes a group of receivers for receiving signals from several radio transmitters at fixed locations. Two of these transmitters which are utilized for obtaining distance information to a point of destination are located so that one of the transmitters is essentially ahead of the vehicle while the other is essentially behind the vehicle during the entire trip. The other pair of transmitting stations, which are utilized for providing steering information to the destination point (one of which may be one of the transmitters utilized for obtaining distance information), are preferably located along a line substantially normal to the vehicle track line from the origin to the destination. The equipment is calibrated before leaving the point of origin so as to take into account the change in travel time difference to be expected between the signals received from each of the two pairs of transmitters at the point of origin and at the point of destination, the equipment calibration being such that when the vehicle arrives at the point of destination, the difference reading between the pair of distance signals is zero. The steering signals are compensated for by the distance signals, so that when the vehicle is on the proper track, a "zero" steering signal will be presented, while when off the track to the left or right, appropriate signals are provided to indicate such deviation. Thus, the time related signals are utilized to provide distance information to the destination as well as steering information to enable the steering of the vehicle directly to such destination.

Figure 2:
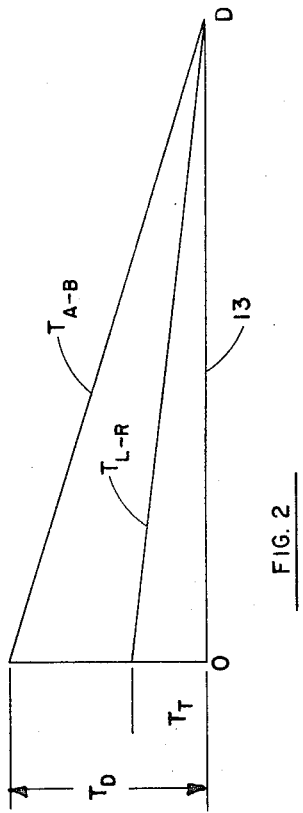
FIG. 2 is a graphical illustration illustrating the computation of the distance and steering information in the device of the invention.

Referring now to FIGS. 1 and 2, the basic features of operation of the system of the invention are illustrated. Vehicle 11, on which the equipment of the invention is carried, is shown traversing a direct path from an origin location "O" to a destination location, "D." Navigational signals for navigating the aircraft are transmitted from transmitter "B," 14, and transmitter "A," 15, to provide continuous information as to distance to destination point "D," while steering information indicating any deviation from the direct path between the two points is provided by means of transmitter "L" 17, and transmitter "R" 18, which are to the left and the right of the vehicle track respectively. It is to be noted that transmitter A, 15, is ahead of the vehicle track, while transmitter B, 14, is behind the vehicle track, the choice of transmitters in these relative locations being necessary.

Referring to FIG. 1, let us designate the difference in the travel time between the signal transmitted to point "O" from transmitter "B," and the signal transmitted from this same transmitter to point "D," "$T_B$," and the difference in travel time between the signal transmitted from transmitter "A" to point "O" and that transmitted to "D" from this second transmitter "$T_A$." The change in the relative travel times and thus change in timing relationship between the signals received from these two stations at point "O" as compared with point "D." which results in a corresponding relative timing change $T_D$ between these two signals in travelling between these two points can be represented as follows:

$$T_D = T_A + T_B \quad (1)$$

Referring now to FIG. 2, the relative timing change, $T_D$, involved in going from locations "O" to "D" is used as a calibration signal in an appropriate computer system, as to be explained further on in the specification, and if the aircraft is flown directly between points "O" and "D," then the timing change, $T_D$, between the signals will be linear as indicated by line $T_{A-B}$. With the computer properly calibrated, the changing timing difference can be made to be a linear reduction in "$T_D$" in traveling from point "O" to point "D."

Insofar as the signals received from transmitters 17 and 18 to the left and right of the vehicle track respectively are concerned, a similar change in timing difference between these two signals will occur in traveling between points "O" and "D" for the illustrative example of FIG. 1. Thus, the travel time of the signal arriving from transmitter 17 to which aircraft 11 comes closer will decrease while the travel time of the signals arriving from transmitter 18 will increase. It is to be noted that if the track line 13 of the aircraft were normal to a line drawn between transmitters 17 and 18, there would be no change in relative travel time between the two signals in traversing the track line between the two points. If aircraft 11 is maintained on track line 13 in going between the points "O" and "D" and the difference in the travel time of the signals is represented by $T_T$ as shown in FIG. 2, then this relative travel time can be made to change linearly as indicated by line $T_{L-R}$ during the trip. It should be immediately apparent that the following relationship exists:

$$T_{L-R} = (T_{A-B})/K \quad (2)$$

The relationship set forth in equation (2) is implemented in the device of the invention to derive accurate steering signals in a highly unique manner, as to be explained more fully further on in the specification. It should be readily apparent from the foregoing discussion, that by making timing comparisons between signals arriving from transmitters ahead of and behind the vehicle during the trip, that distance information can be derived by virtue of the comparison between these two signals, and that in similar fashion by making timing comparisons between signals arriving from transmitters to the left and right of the track line, information can be derived in conjunction with the distance information and a constant, which is indicative of any departure from the track line. It is to be noted at this point that one of the left-right transmitters 17 and 18 can be one and the same as one of the distance transmitters.

Figure 3:
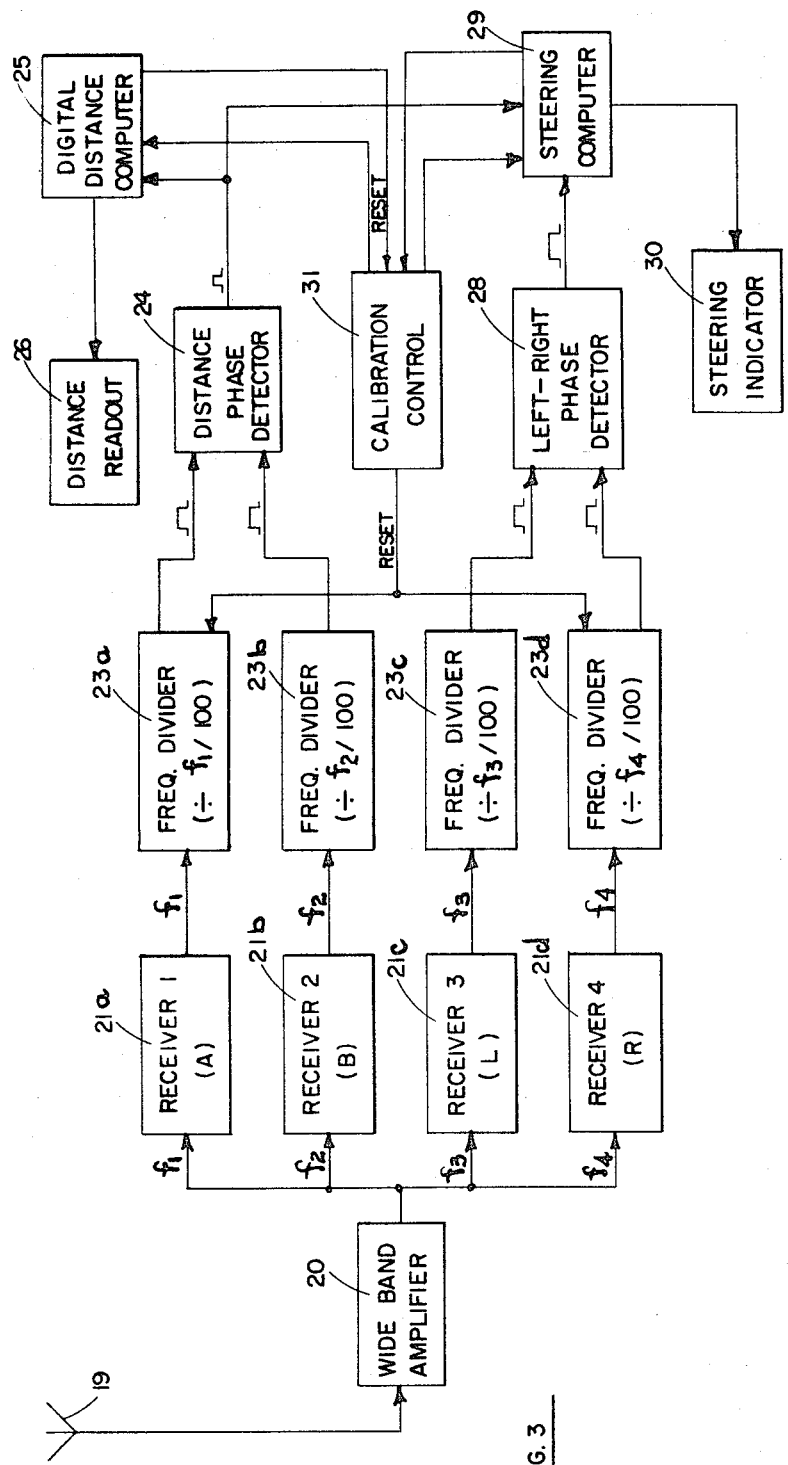
FIG. 3 is a block diagram of the system of the invention.

Referring now to FIG. 3, a block diagram illustrating the system of the invention is shown. Signals transmitted from the four transmitters shown in FIG. 1 are received by antenna 19 and amplified in wide band amplifier 20. Each of transmitters 14, 15, 17 and 18 transmits on a different frequency, the separate frequencies being indicated in FIG. 3 as "$f_1$–$f_4$," $f_1$ and $f_2$ being the outputs of transmitters A and B, while $f_3$ and $f_4$ are the outputs of transmitters L and R respectively. Receivers 21a–21d are tuned to frequencies $f_1$–$f_4$ respectively. The outputs of receivers 21a–21d, which it is to be noted are still at the originally received frequencies, $f_1$–$f_4$, are each first "clipped" to convert them to square waves, as to be explained further on in the specification, and then fed to an associated one of frequency dividers 23a–32d. Each of the dividers divides the frequency of the signal received thereby by a number corresponding to one-hundredth of this signal frequency. Thus, with frequencies $f_1$–$f_4$ of the order of 12–25 kHz, all of the frequency dividers have an output at a frequency of 100 Hz, these signals having a phase relationship which changes in accordance with the position of the vehicle relative to the various transmitters. The phase relationship between these 100 Hz signals is the difference in the time of occurrence of corresponding portions of these rectangular waves. The 100 Hz rectangular wave outputs of frequency dividers 23a and 23b are fed to distance phase detector 24 which may comprise a flipflop, the set input of which is triggered by the output of divider 23b and the reset input of which is triggered by the output of divider 23a.

Phase detector 24 has a rectangular wave output, the positive going portion of which has a pulse width corresponding to the phase difference between the outputs of frequency dividers 23a and 23b. In view of the fact that as already noted the phase difference between the two signals received by the phase detector is indicative of the positional relationship of the vehicle with transmitters A and B, the pulse width of the output of the phase detectors indicates this relationship. The output of distance phase detector 24 is fed to digital distance computer 25 which computes the distance travelled by the vehicle in response to the relative phase information supplied by the phase detector. The output of digital distance computer 25 is fed to distance readout 26, where a readout signal indicative of the distance travelled between the point of origin and destination is provided.

In order to provide information as to the distance travelled between the origin and destination, distance computer 25 must be accurately calibrated prior to the start of the trip. As to be explained more fully further on in the specification, calibration information is supplied through calibration control 31, which includes the distance between the points of origin and destination and the change of relative phase to be expected between the two signals as received at the origin, and as received at the destination. In implementing the calibration, frequency divider 23a is reset by the calibration control to account for the relative phase change to be expected.

The outputs of frequency dividers 23c and 23d which, as already noted, are rectangular waves having a phase relationship which varies in accordance with the position of the vehicle between the left and right transmitters 17 and 18, are both fed to left-right phase detector 28 which may be a flipflop operating in the same manner as described for distance phase detector 24. The output of left-right phase detector 28 thus is a rectangular wave having a positive going portion with a pulse width corresponding to the relative position of the vehicle between the left and right transmitters. The output of phase detector 28 is fed to steering computer 29. As to be explained in detail further on in the specification in connection with FIG. 9, steering computer 29 receives a compensating signal from distance phase detector 24 and a calibration signal from calibration control 31 which in conjunction with the information received from left-right phase detector 28 enables the generation of a left-right steering signal for steering indicator 30. This steering signal may be in the form of a voltage which varies about a zero point whenever the vehicle is off the desired track. Under such conditions, steering indicator 30 may comprise a voltmeter having a "zero" center position.

Steering computer 29 must be calibrated before the trip is commenced by means of calibration control 31, the calibration information in this instance including the change to be expected in the travel time between the signals driving from the left and right transmitters at the origin and at the destination points and a fixed signal which represents a balanced steering condition desired when the vehicle reaches the destination point. This calibration information is utilized as the constant "$k$" of equation (2) in implementing the invention.

Figure 4:
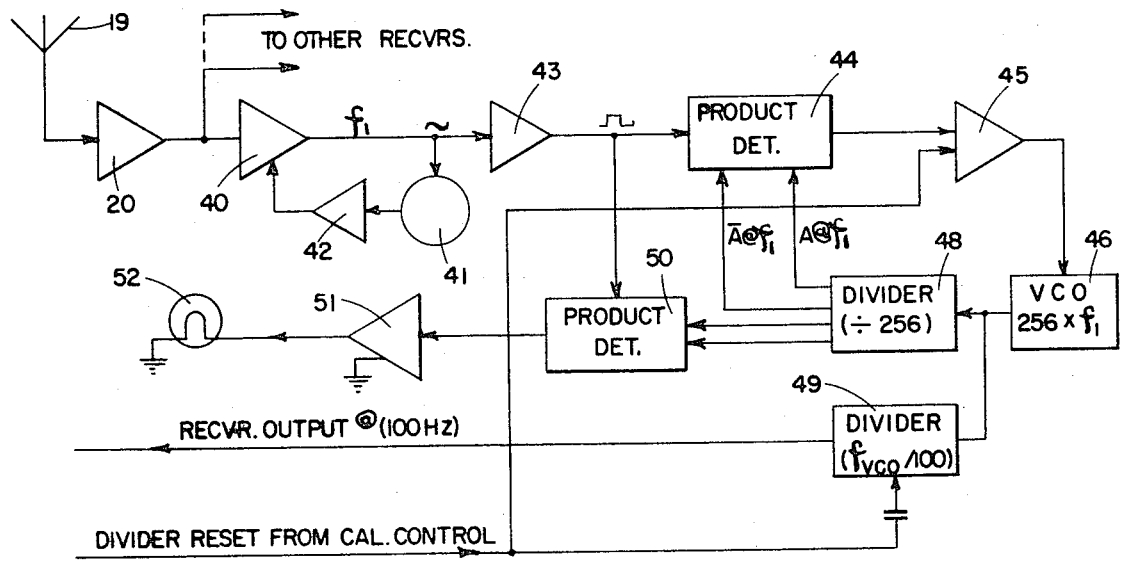
FIG. 4 is a functional block diagram of one embodiment of a receiver and frequency divider which may be utilized in the system of the invention.

Referring now to FIG. 4, a typical receiver and frequency divider which may be utilized in the system of the invention is schematically illustrated. It is to be noted that a separate receiver and divider as shown in FIG. 4 is provided for each of the separate signals, as shown in FIG. 3. It is also to be noted that in certain instances only three receivers need be utilized, one of these receivers functioning dually to provide one of the left-right and one of the distance signals. The signals received by antenna 19 are amplified in broad band amplifier 20 and fed to radio frequency amplifier 40, where they are appropriately amplified. Amplifier 40 is tuned to only one of the signal frequencies as shown in FIG. 4, this being the frequency, $f_1$ which is the receiver "A" signal of FIG. 3. Frequency $f_1$, as already noted, typically may be of the order of 12–25 kHz.

Automatic gain control to optimize the operation of amplifier 40 is provided by means of detector 41 and amplifier 42 which provides a gain control signal to the amplifier 40 in accordance with the average output thereof. The output of RF amplifier 40 is "clipped" by means of limiting amplifier 43, thus converting the sine wave signal to a square wave signal. The square wave output of limiter 43 is fed to product detector 44. The output of detector 44 is fed to integrating amplifier 45, and thence to voltage controlled oscillator 46.

Voltage controlled oscillator 46 is tuned to a substantially higher frequency than $f_1$, which may be 256 times this frequency, as shown in FIG. 4. Voltage controlled oscillator 46 is phase locked with the 256th harmonic of $f_1$ by means of the phase lock loop which includes product detector 44, integrating amplifier 45 and divider 48. This circuit operates in the following manner:

The output of voltage controlled oscillator 46 is divided by 256 by means of divider 48, the output of this divider thus being at frequency, $f_1$. Divider 48 provides a signal, "A," which is in phase with the divided output of the voltage controlled oscillator 46 and a signal, $\overline{A}$, which is 180° out of phase with this signal, to product detector 44. Product detector 44 may comprise a phase detector which compares the phase of the output of limiter 43 with that of the output of divider 48, and provides a DC output to integrator 45, the magnitude and polarity of this DC signal being indicative of the phase difference therebetween. This DC signal as integrated in integrator 45 is utilized to control voltage controlled oscillator 46 so as to phase lock its divided output with the input signal, $f_1$. Phase lock circuits of the type just described are well known in the art and are described, for example, in PHASE LOCK TECHNIQUES by Floyd Gardner, published by John Wiley & Sons.

The output of voltage controlled oscillator 46 is fed to divider 49 wherein the signal is divided by one hundredth of the frequency of the voltage controlled oscillator ($f_{vco}/100$). Thus, the output of divider 49 is a rectangular wave signal at 100 hz, this signal having a phase dependent on that of $f_1$. Divider 49 receives a reset signal from calibration control 31 (see FIG. 3), used in calibrating the system, as to be described in connection with FIGS. 5 and 6. A dead reckoning control signal may also be provided to integrator 45 to afford dead reckoning information where lapses in navigational signals occur.

Signals are also provided from divider 48 to product detector 50 for phase comparison with the output of limiter 43. Product detector 50 produces a maximum output when oscillator 46 is phase locked with the input signal. The output of product detector 50 is filtered and amplified in filter-amplifier 51 and the output of this amplifier used as the supply voltage for indicator lamp 52. Thus, when the input signal is of sufficient strength and the voltage controlled oscillator is phase locked to this signal, indicator lamp 52 will illuminate indicating that the signal is usable for navigation purposes.

Figure 5:
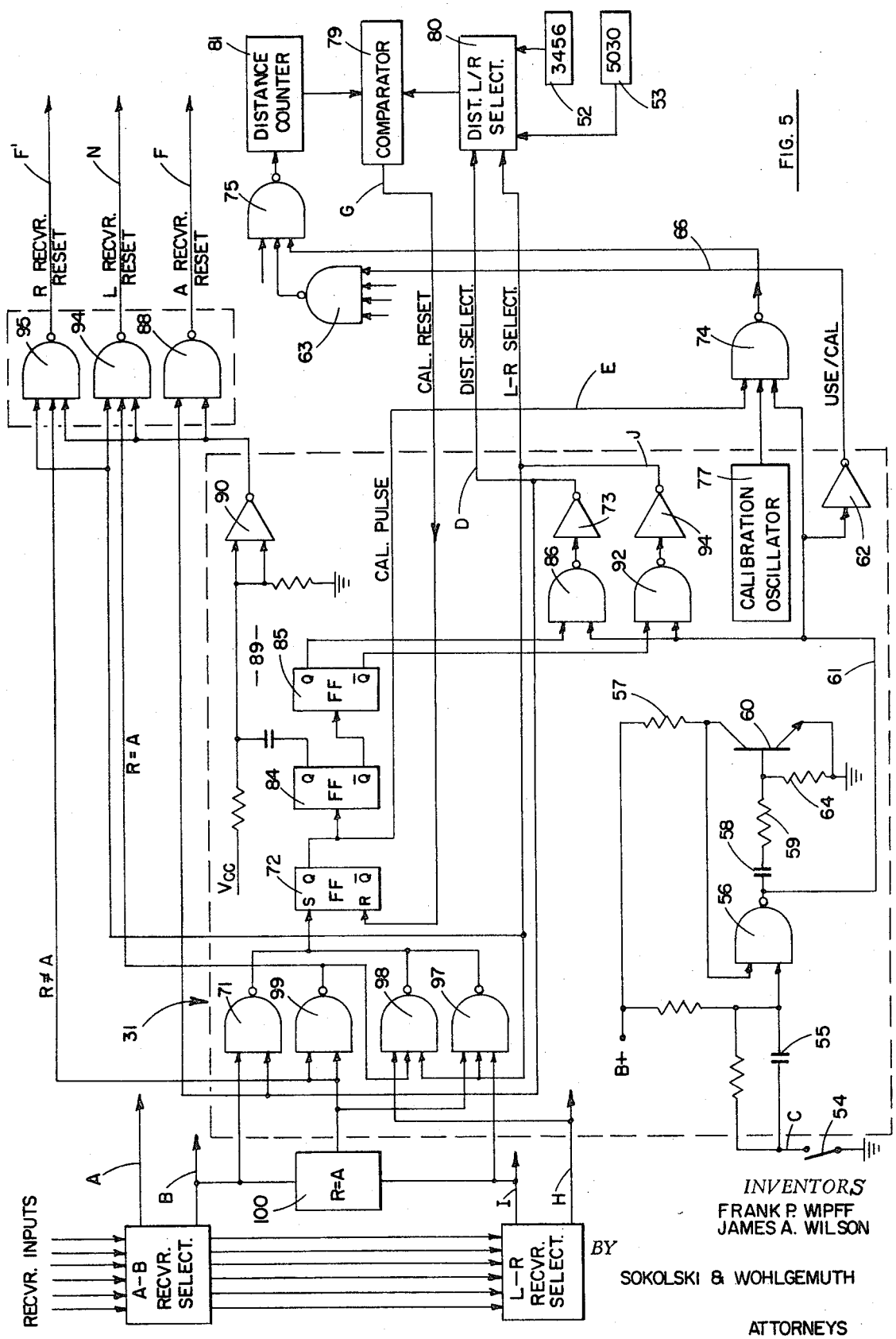
FIG. 5 is a functional block diagram illustrating the calibration function of the system of the invention.

Referring now to FIGS. 5, 6A and 6B, calibration circuitry which may be utilized in the system of the invention and waveforms developed in conjunction therewith are respectively illustrated. Momentarily referring to FIG. 1, it is first to be noted that prior to departure from the origin, suitable tables must be consulted to determined the change in the difference between the travel times of the signals received from the distance transmitters 14 and 15 at the origin and at the destination, and similarly the difference in travel time relationships between the signals from the steering transmitters 17 and 18 as received at the origin and as received at the destination. For convenience of use in the system, tables may be tabulated indicating in "microseconds" the travel times of signals from each of the transmitters to the origin and destination, and then these tabulated values appropriately used to manually compute the needed distance and steering calibration information.

The distance calibration information is "cranked into" distance switch 52. For illustrative purposes, this distance information is shown in FIG. 5 as "3456" this indicating the change in travel time difference between the signals as received at the origin and as received at the destination. The calibration information for the left-right switch 53 is derived in the same manner. However, in this instance "5000" is added to the difference information, shown for exemplary purposes as "30," and the total "5030" cranked into left-right switch 53. Switches 52 and 53 may comprise mechanically operated rotary switches which produce an output in accordance with the reading set thereon, in binary coded decimal form.

Before describing the calibrate function, note that line 61 is normally low by virtue of the fact that both inputs to NAND gate 56 are high. To initiate the calibrate function, calibrate switch 54 is momentarily actuated. This produces a momentary negative going step, as indicated in line (C) of FIG. 6A. This results in a negative pulse being fed through capacitor 55 to one of the inputs of NAND gate 56. The negative pulse on the input of NAND gate 56 forces the output of NAND Gate 56 (line 61) to go high, this high output being coupled through capacitor 58 and resistor 59 to the base of transistor 60. Transistor 60 is driven to a conductive state (saturation) by this voltage, thereby bringing its collector to substantially ground potential. Since the second input to NAND gate 56 is connected to the collector of transistor 60, this input is held low during the time that transistor 60 is in the conductive state, thereby maintaining the output of NAND gate 56 high. The high output from NAND gate 56 on line 61, which output is inverted to inverter 62, and fed to NAND gate 63 to activate the "calibrate" mode of operation. It is to be noted that transistor 60 will only remain conductive for a time period determined by the time constant of the R-C network formed by capacitor 58 and resistors 59 and 64. This time constant is typically chosen so as to provide a calibrate mode having approximately a half-second duration. The low output from inverter 62 on line 66 acts as an inhibiting signal for NAND gate 63 and prevents the passage of distance information through gate 63 to distance counter 81 during the "calibrate" mode of operation.

Let us first see how the calibration of the distance circuits is accomplished. The first negative going transition of the "B" receiver output after the calibrate switch 54 is pressed (see line "B" of FIG. 6A) triggers the calibrate pulse line E to "HIGH," as shown in line "E" of FIG. 6A, this end result being achieved by virtue of the gating circuitry including NAND gate 71 and RS flipflop 72, NAND gate 71 receiving the "B" receiver output and an enabling signal for the distance calibrate function from inverter 73. The calibrate pulse on line E provides an enabling signal to NAND gate 74. NAND gate 74 is further enabled by the output of NAND gate 56, which as previously described provides an appropriate control signal throughout the calibrate mode. With gate 74 thus enabled, the output of calibration oscillator 77 is fed through gate 74 and thence through gate 75 to drive distance counter 81. Calibration oscillator 77 preferably has a frequency of 1 mHz to facilitate calibration.

A signal in accordance with the output count of distance counter 81 is fed to comparator 79 where this count is compared with the count set on distance switch 52 which is fed to the comparator through distance-left/right selector 80. When the count of the output of distance counter 81 reaches the count set on distance switch 52, a calibrate reset pulse is generated by the comparator and fed on line G to the reset input of flipflop 72, thus causing the calibrate pulse line E to go low. When line E goes low, it provides a clock pulse for bistable flipflop 84 which in response to this clock pulse provides a clock pulse for bistable flipflop 85. The "Q" output of flipflop 85 provides a gating signal for NAND gate 86 which, as already noted, is receiving an enabling signal from gate 56. The output of NAND gate 86 is inverted by means of inverter 73 to provide the distance (A/B) calibrate signal on line D. The signal on line D provides several functions including the setting of selector 80 for distance calibration, the enabling of NAND gate 71 and the enabling of NAND gate 88.

The next negative transition of the B receiver output again causes the calibrate pulse line E to go HIGH. The same sequence of events as described above occurs, except that the HIGH to LOW transition of the calibrate pulse line E triggers flipflop 84, the "Q" output of which is inverted in inverter 90 and fed through gate 88. A reset pulse is thus generated on line F, this reset pulse being fed to the divider 49 for the "A" receiver output (see FIG. 4), resetting this divider to zero. This reset signal which is only fed to the divider for the "A" receiver causes this divider output to be delayed in time from the negative transition of the "B" receiver divider output by an amount equal in microseconds to the number set into the distance switch 52. For the example shown in FIG. 5, this delay which is indicated in FIG. 6A on line B thereof as "$T_D$" is 3456 microseconds.

The "A" receiver reset signal on line F is provided in the following manner: The negative going transition of the calibrate pulse on line E provides a clock pulse to flipflop 84. The "Q" output of flipflop 84 is differentiated in R-C circuit 89 and fed through inverter 90 as a drive signal for NAND gate 88. As already noted, NAND gate 88 is enabled by the signal on line D and therefore passes this reset signal through to line F.

The calibration of the left-right receivers is then achieved in the following manner: The negative transition of the "B" receiver output, designated in FIG. 6A as B', initiates the calibrate sequence, causing a calibrate pulse to be generated on line E. However, the next HIGH to LOW transition of the calibrate pulse line E causes the distance calibration gate signal on line D to go LOW, and the left-right calibration gate on line J to go HIGH. This end result is implemented by means of the "toggle" action of flipflops 84 and 85, flipflop 85 operating at one half the frequency of flipflop 84. Thus, the negative transition of the calibrate pulse on the line E drives flipflop 84 to provide a drive pulse for flipflop 85. The "Q" output of this flipflop goes LOW and the "$\bar{Q}$" output HIGH.

Thus, in this manner, gate 86 is inhibited and gate 92 enabled. The output of gate 92 is inverted by inverter 94 and fed to line J to provide the left-right calibration enabling signal. The signal on line J operates to cause selector 80 to feed the output of left-right switch 53 to comparator 79. This signal also provides an enable signal for left and right receiver reset gates 94 and 95, as well as providing enabling signals for NAND gates 97 and 98.

Let us assume first that separate receivers are to be used for each of the distance and left and right signals (i.e., there is no dual use of one receiver for both one of the left-right and one of the distance signals). Under such conditions, the signal on line J provides an enabling signal to both gates 97 and 98. However, to be actuated, gate 98 requires a further enabling signal from gate 99, indicating that one of the steering and distance receivers is not to be combined. Gate 99 operates in response to logical gate 100 which is manually set in this instance to provide an output signal indicating that a combination of receiver signals is not to be utilized. Gate 98 thus is enabled such that the first signal from the LEFT receiver on line H occurring after the commencement of the left-right calibrate gate (line J) will pass through gate 98 to provide a set signal for calibrate flipflop 72. The output of calibrate flipflop 72 (line E) thus goes HIGH in response to the negative going transition of the LEFT receiver.

The sequence of operation that follows is the same as described for the distance receivers except that the output of distance counter 81 is now compared with the output of left-right switch 53 in comparator 79 rather than the output of distance switch 52, such operation being implemented by virtue of the presence of the control signal on line J which is fed to selector 80. Thus, the output of comparator 79 resets calibrate flipflop 72 when the count set on switch 53 is reached. The calibrate signal on line E thus is given a pulse width corresponding to this count.

The HIGH to LOW transition of the output of flipflop 72 triggers flipflop 84 which is inverted in inverter 90. The output of inverter 90 in turn provides a reset signal through gate 95 which appears on line F', and is used to reset the divider which receives the output of the RIGHT receiver. This causes the output of the RIGHT receiver divider to be delayed in time from that of the LEFT receiver divider output by an amount equal in microseconds to the setting of switch 53 (in the illustrative example 5030 microseconds). This is noted under line G of FIG. 6A as $T_T + 5000\ \mu$.

The next HIGH to LOW transition of the calibrate pulse line E causes the left-right calibrate gate signal to go LOW and the A/B calibrate signal to go HIGH, and so on for the duration of the calibrate cycle (approximately one-half second). In this manner, the distance and steering signals are alternately calibrated during the calibrate mode of operation.

Where the same receiver is utilized dually to provide both one of the distance and one of the steering signals, for example both "R" and "A," the calibration sequence must be somewhat altered since it will immediately be apparent that the same receiver output divider cannot be calibrated to permform both functions. No change is necessary in the A-B distance calibration, the "A" receiver being calibrated as just described to the number set in the distance switch. However, during the L-R calibrate sequence, the "R" receiver output negative transition is used to set the calibrate pulse line HIGH instead of the "L" receiver output. This operation is described in the waveforms shown in FIG. 6B (lines K–O). Control 100 operates to feed the output of the RIGHT receiver as utilized for the "A" function through the gating circuitry to provide a reset signal for the left receiver through gate 94 on line "N," in the same general manner as previously described. It is further to be noted that the number set into left-right switch 53 in this instance is found by subtracting the computed number from 10,000. That is to say, for the illustrative example of FIG. 5, switch 53 would be set to 4970.

Figure 7:
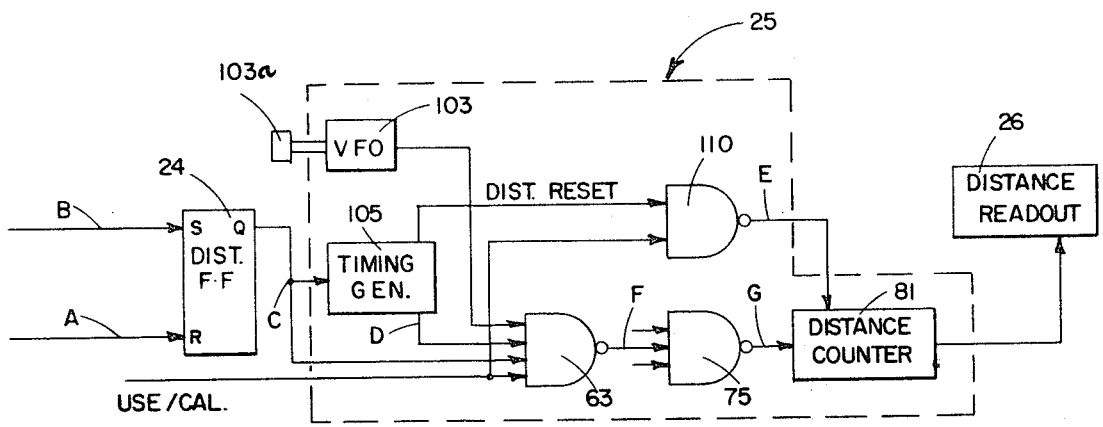
FIG. 7 is a functional block diagram illustrating distance measurement circuitry which may be utilized in the system of the invention.

Referring now to FIGS. 7 and 8, the circuitry for performing the distance measurement in the system of the invention and waveforms relevant thereto are respectively illustrated. As already described in connection with FIGS. 1 and 2, two radio stations, "A" and "B," are used for the distance measurements, these stations being chosen so that the direction of travel is away from station "B" and towards station "A." Further, a number representing the difference in microseconds between the two signals as received at the point origin and as received at the point of destination is fed into the system by appropriately resetting one of the receiver's dividers during a calibration mode of operation as described above. The output of the "B" receiver shown on line "B" of FIG. 8 is provided as a set input to flipflop 24, while the "A" receiver output is fed to the reset terminal of this flipflop. Flipflop 24 has an output as indicated on line C, this output representing the distance to go to the destination point.

Figure 10A:
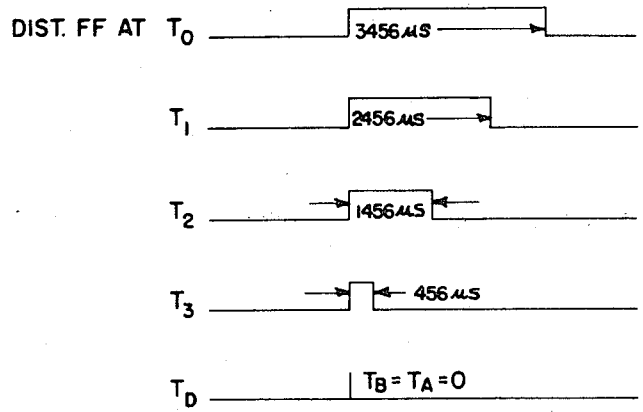
FIGS. 10A–10C illustrate a series of waveforms which may be developed in the system of the invention in making various trips as shown in FIG. 11.

Referring now to FIG. 10a, typical outputs at times $T_o$, $T_1$, $T_2$, $T_3$, and $T_D$ for various positions at and between the origin and destination points are illustrated. These are shown for the situation where the calibration at the origin is 3456 microseconds. As can be seen, the output of distance flipflop 24 gradually decreases and finally reaches zero when the destination point is reached at time $T_D$.

In order for the system to provide distance readings to the destination in miles, it is necessary to enter into the system the straight line distance between the starting point and the destination. This is done by adjusting the frequency of variable frequency oscillator 103 by means of knob 103a so that the distance readout 26, which may be on appropriate digital readout device, reads this distance when the vehicle is at the origin. The output of variable freqeuncy oscillator 103 is fed to NAND gate 63. Also fed to this gate is the output of distance flipflop 24 (line C) and an enable signal from timing generator 105 (line D). Timing generator 105 is synchronized with a negative transition of the output of flipflop 24 and operates to periodically provide samplings of the distance measurements for distance readout 26. The details of the timing generator need not to explained, as this may comprise any standard digital timing circuit as is well known in the art. Thus, periodically gate 63 will have a burst of output pulses at a frequency of oscillator 103, and for a time period determined by the pulse width of the output of distance flipflop 24. As already explained in connection with FIG. 5 with the description of the calibration function, gate 63 also receives a signal which inhibits its operation during the calibrate mode so that no distance measurements can be made during that time.

Distance counter 81 also receives a reset signal from timing generator 105 through NAND gate 110 which resets the counter to zero before each distance measurement is made. In a typical operating embodiment of the invention, distance measurements are made on every 200th distance flipflop output cycle as shown in FIG. 8. Referring particularly now to FIG. 8, with the distance flipflop output cycle marked "1" in line C, the output of timing generator 105 goes HIGH when the output of the distance flipflop 24 goes LOW. At the same time, the timing generator sends a reset pulse (line E) through gate 110, which resets distance counter 81 to zero. When the distance flipflop cycle "2" goes HIGH (line C), the output of variable frequency oscillator 103 is fed through gate 63 (line F) and gate 75 (line G) to distance counter 81 which counts the total number of clock pulses that occur during the period that the distance flipflop output is HIGH. The negative transition of distance flipflop output cycle "2" terminates the count of the distance counter and the same time causes the output (line D) of timing generator 105 to go LOW, thereby inhibiting gate 63. Gate 63 is inhibited in this fashion by virtue of the programming set into timing generator 105 until the negative transition of the distance flipflop output cycle 199 (line C), at which time the output of the timing generator goes HIGH and the measurement cycle is repeated. During the time that the output of timing generator 105 to gate 63 is LOW inhibiting this gate, the distance measurement is displayed on distance readout 26. In this manner, a readout is repetitively provided in terms of miles to the destination in accordance with the pulse width of the output of distance flipflop 24.

Referring now to FIGS. 9, 9A, 10B, 10C and 11, the operation of the steering control in the system of the invention will now be described. Referring particularly to FIGS. 9 and 9A, the divided outputs of the "L" and "R" receivers of FIG. 3 are fed to the set and reset inputs of flipflop 28. Thus, the output of flipflop 28 is a rectangular wave, the output of which goes HIGH in response to the "L" receiver and LOW in response to the "R" receiver output. The output flipflop 28 is fed to summing resistors 121 of steering computer 29. The output of distance flipflop 24 is fed through the calibration circuit including transistors 113, 116 and 117 and resistors 118, 119 and 122, the summing resistors 121 for summation with the output of flipflop 28. The output of flipflop 24 is fed through resistor 111 to transistor 113 and through resistor 112 to transistor 117. The output of transistor 113 is fed through resistor 115 as a drive signal for transistor 116. Bias is provided for transistor 116 from voltage source 120 through resistor 114. The collectors of transistors 116 and 117 are interconnected by resistors 118 and 119.

Voltage source 120 provides a voltage E (as shown in FIG. 9A) to the emitter of transistor 116. Equal resistance resistors 130 and 131 form a voltage divider across voltage source 120 and develop reference voltage $E_R$ which is equal to E/2. This reference voltage is fed to the interconnection between equal resistance resistors 118 and 119 as well as differential amplifier 127 and Left-Right indicator 30. The opposite ends of calibration potentiometer 122 are connected across resistors 118 and 119, the arm of this potentiometer being connected to one of summing resistors 121. The summed output of resistors 121 is fed to differential amplifier 127.

It will be readily apparent as indicated in FIG. 9A that the signal at the collector of transistor 116 (point A) and the signal at the collector of transistor 117 (point B) are rectangular waves which are in phase opposition in an edge to edge mirror image relationship. These waves as shown in FIG. 9A run above and below $E_R$ respectively.

Consider the condition where the negative transition of the "R" receiver output is calibrated to occur 5,000 microseconds after the negative transition of the "L" receiver output. The "L" receiver output sets the output of flipflop 28 HIGH, and the "R" receiver output resets it LOW. With the outputs of all of the receivers having a repetition rate of 100 $H_z$ the output of flipflop 28 will be a 100 Hz symmetrical square wave. The average DC value of this square wave will be E/2 where E is its peak-to-peak voltage. With the reference voltage $E_R$ equal to E/2 and if the signal fed from distance flipflop 24 to transistor 113 is equal to zero, the output of summing resistors 121 will be equal to $E_R$ so that indicator needle 30 will be centered.

However, if the output of flipflop 28 becomes unsymmeteical because of a relative time shift between the "L" and "R" receiver outputs, the needle of indicator 30 will deflect to the left or right of its zero center position, depending upon whether the result in average DC is less than or greater than $E_R$.

To illustrate how the device typically operates, attention is now directed to FIGS. 10A–10C and FIG. 11. Referring particularly to FIG. 11, lines k represent loci of constant phase relationship between signals received from the "L" and "R" transmitters. Line m represents a flight path between "origin 1" and "destination 1" that is at all times parallel to the lines of constqnt phase so that the relative phase between the "L" and "R" receiver outputs remains constant throughout this trip. Thus, with the system calibrated to make the output of flipflop 28 symmetrical before the trip is commenced, the plane would be flown to maintain this condition throughout the trip. It is to be noted that for this type of operation, it would be necessary to adjust potentiometer 122 for a balanced reading on indicator 30 before starting the trip.

Let us now consider a more typical trip between origin No. 2 and destination No. 2 as indicated by line n in FIG. 11 which cuts across lines of constant phase. For the purpose of this discussion it is assumed that the "L" and "R" transmitters are far enough away and the trip sufficiently short that the lines of constant phase can be considered to be parallel straight lines. From the diagram of FIG. 11, it can be seen that the signal from the "L" station arrives earlier at destination No. 2 than at origin No. 2 by the amount $T_{1a}$ which can be described as follows:

$$T_{1a} = \Delta \text{ distance}/V_1 \qquad (3)$$

where $\Delta$ distance is as indicated in FIG. 11 and $V_1$ is the velocity of propagation of this signal from the "L"

transmitter. Similarly, the signal from the "R" transmitter arrives later at destination No. 2 than at origin No. 2 by the amount $T_{rd}$ which can be represented as follows:

$$T_{rd} = \Delta \text{ distance}/V_2 \tag{4}$$

where $V_2$ is the velocity of propagation of the signal from the "R" transmitter. Since it is the L receiver output that is setting the output of flipflop 28 and the R receiver output that is resetting it, it is apparent that the HIGH state of the output of the flipflop will become progressively longer as the flight path from origin No. 2 to destination No. 2 is travelled. This condition is shown in FIG. 10C for various positions as indicated in FIG. 11 along the flight path $n$. As already noted in connection with FIG. 10A, it can be seen that the output of distance flipflop 24 progressively decreases in width from the origin to destination, this decrease being linear as shown in FIG. 2. Thus, by adding a portion of a signal in accordance with the output of distance flipflop 24, the ratio of this portion being determined by the initial setting of potentiometer 122, it can be seen that a compensation signal $T_{A-B}$ is provided as graphically indicated in FIG. 2 which will provide a zero output from indicator 30 as long as we remain on the proper track. It is to be noted, of course, that in order to provide a direct track to the destination, it is important that prior to departure from the point of origin potentiometer 122 be set so that the output of amplifier 127 is zero so as to provide a zero indication on indicator 30.

It should be immediately apparent that since the compensating signal from flipflop 24 goes to zero at the destination, the output of flipflop 28 must go to 5,000 microseconds (symmetrical square wave) at the same time in order for the indicator 30 to be centered at the destination. As already explained in connection with FIGS. 5 and 6, the system must of course initially be calibrated before departure from the origin so that the output of flipflop 28 is shorter than 5,000 microseconds by the difference in travel time relationship between the signals from the Left and Right transmitters as received at the origin and as received at the destination. With the assumptions made in this discussion, that is, that the lines of constant phase $k$ are parallel straight lines, the flight path to maintain indicator 30 centered will be a straight line between the origin and destination. However, since the lines of constant phase may have some curvature, the actual flight path to maintain this condition may be somewhat curved but will always pass through the point of origin and the point of destination.

Figure 10B:
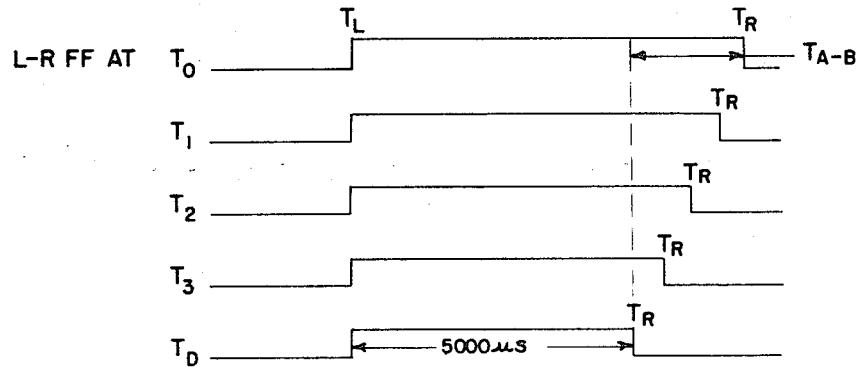
Figure 10C:
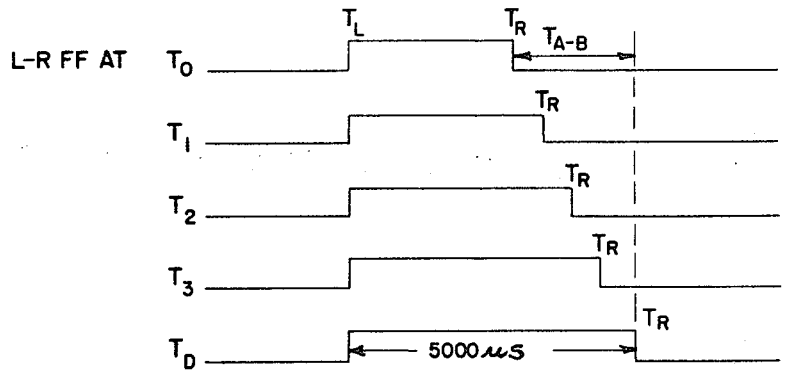

Referring now to FIG. 10B and FIG. 11, another hypothetical trip between origin No. 3 and destination No. 3 as represented by track line $o$ is illustrated. In this trip, the flight path is towards the "R" trnsmitter and away from the "L" transmitter. Here, as can be seen, the output of flipflop 28 decreases in width by the amount $T_{A-B}$ during the voyage. Since it is necessary for the output of flipflop 28 to be equal to 5,000 microseconds at the destination when the contribution of the distance flipflop 24 is zero, it is necessary to calibrate at the outset such that the output of flipflop 28 at the origin is greater than 5,000 microseconds by the expected change in phase during the voyage, at the origin.

Indicator 30 is then centered by substracting a sufficient amount of the distance flipflop output from the L-R flipflop output so that the composite signal is equal to that of a symmetrical square wave. Once centered as described above, the needle of indicator 30 will remain centered as long as the indicated flight path between the origin and destination is followed.

The system of this invention thus provides means for navigating between an origin and destination by utilizing signals from regular radio transmitters or those established for use in other types of systems. No directive antennas or complicated computing equipment is required on the vehicle, and steering information as well as information as to distance to the destination is continually provided in easily usable form.

We claim:

1. In a radio navigation system for navigating a vehicle along a track line between an origin and a destination point utilizing a plurality of radio signals, including signals transmitted from points ahead of and behind said track line and to the left and right of said track line, means for converting said signals to a common frequency, means for generating a distance signal in accordance with the phase relationship between a first pair of said common frequency signals representing signals transmitted respectively from ahead of and behind said track line, said distance signal representing distance to go to the destination, means for calibrating said distance signal at the origin so that it represents the change in the travel time difference between said first pair of signals as received at the origin and as received at the destination, means for generating a left-right signal in accordance with the phase relationship between a second pair of said common frequency signals representing signals transmitted respectively from the left and right of said track line, and means for generating a steering signal indicating any deviation from said track line in response to the algebraic sum of signals in accordance with said Left-Right signal and said distance signal.

2. The system of claim 1 wherein said means for generating a steering signal comprises a steering computer for computing the vehicle position relative to said track line and an indicator responsive to the output of said computer for indicating any deviations to the left or to the right of said line.

3. The system of claim 2 wherein said steering computer includes a calibration potentiometer for adjusting the distance signal when the vehicle is at the origin to produce a zero deviation indication on said indicator.

4. The system of claim 1 and further including a digital distance readout for providing a continual indication of distance to go to the destination in response to said distance signal.

5. The system of claim 1 and including means for calibrating said Left-Right signal at the origin to represent the change in the travel time difference between said second pair of signals as received at the origin and as received at the destination.

6. The system of claim 3 wherein said steering computer includes a DC reference voltage source for establishing a reference voltage for said indicator and said steering computer, said computer providing a DC output to said indicator above said reference voltage when the vehicle is on one side of the track line and below said reference voltage when the vehicle is on the other side of the track line.

7. A method for providing navigation control signals for guiding a vehicle on a track line between an origin and destination point by utilizing a plurality of radio signals including a first pair of signals transmitted from points ahead of and behind said track line respectively, and a second pair of signals to the left and right thereof respectively, comprising the steps of:

setting into a distance measuring circuit a calibration factor in accordance with the change in travel time difference between said first pair of signals as received at the origin and destination points, setting into a Left-Right measuring circuit a calibration factor in accordance with the change in travel time difference between said second pair of signals as received at the origin and destination points, feeding said first pair of signals to said distance measuring circuit and deriving a signal in accordance with the time relationship therebetween representing distance to go to the destination, feeding said second pair of signals to said Left-Right measuring circuit, and summing the output of said Left-Right measuring circuit with a signal in accordance with the output of said distance measuring signal to provide a signal for steering the vehicle along said track line.

8. The method of claim 7 wherein the distance calibration factor is such that the output of the distance measuring circuit goes to zero when the vehicle arrives at the destination, and the Left-Right calibration factor is such that the output of the Left-Right measuring circuit goes to a value representing zero deviation from the track line when the vehicle arrives at the destination.

9. The method of claim 7 and further including the step of digitally reading out the output of said distance measuring circuit to provide a continuous readout signal in accordance with miles to go to the destination point.

10. In a radio navigation system for navigating along a track line between an origin and destination point by utilizing a first pair of signals for deriving distance information received from a first transmitter ahead of the track line and a second transmitter behind the track line, and a second pair of signals for deriving steering information received from transmitters to the left and right of the track line comprising:

receiver means for receiving said signals;

divider means for dividing said signals down to a common frequency;

distance phase detector means for generating a distance signal in accordance with the time relationship between the pair of signals received from the transmitters ahead of and behind the track line;

left-right phase detector means for generating a signal in accordance with the time relationship between the signals received from the transmitters to the left and the right of the track line;

digital distance computer means for deriving a signal in accordance with distance to the destination in accordance with the output of said distance phase detector;

calibration control means for calibrating said digital distance computer means so that the output thereof represents the distance between the origin and destination when the vehicle is at the origin and is zero when the vehicle reaches the destination;

distance readout means for providing a readout in accordance with the output of said digital distance computer, and steering means including steering computer means for deriving a signal indicative of the position of the vehicle relative to the track line between the origin and destination, said steering computer means operating in response to the output of said left-right phase detector and said distance phase detector and including means for summing a signal proportional to a preselected portion of the output of the distance phase detector with the output of the left-right phase detector, the distance phase detector output providing a compensating signal which decreases linearly from a maximum value at the origin to zero at the destination.

11. The system of claim 10 wherein said steering means includes steering indicator means for indicating any deviation from said track line between origin and destination, said steering indicator means operating in response to the output of said steering computer means.

12. The system of claim 11 wherein said steering computer means includes means for adjusting the output of the distance phase detector at the origin to provide a "zero" indication on said steering indicator means.

13. The system of claim 10 wherein said calibration control means includes means for calibrating the distance computer means at the origin so that the distance signal represents the change in the travel time difference between the signals from transmitters ahead of and behind the track line as received at the origin and as received at the destination.

14. The system of claim 12 wherein said steering computer means includes a DC reference voltage source for establishing a reference voltage for said indicator and said steering computer means, said computer means providing a DC output to said indicator above said reference voltage when the vehicle is on one side of the track line and below said reference voltage when the vehicle is on the other side of the track line.

15. The system of claim 10 wherein said calibration control means includes means for resetting the divider means for one signal of each of said pairs of received signals.

16. The system of claim 15 wherein said means for resetting the divider means includes distance switch means for manually setting a signal representing the distance to be traversed between the origin and destination and left-right switch means for manually setting a signal representing the track line orientation and control means responsive to the settings on said switch means for generating the divider reset signals.

* * * * *